Nov. 24, 1959     R. C. QUACKENBUSH     2,913,934
TOOL FEEDING DEVICE WITH MEANS FOR LIMITING STROKE OF TOOL
Filed Feb. 11, 1957     2 Sheets-Sheet 1
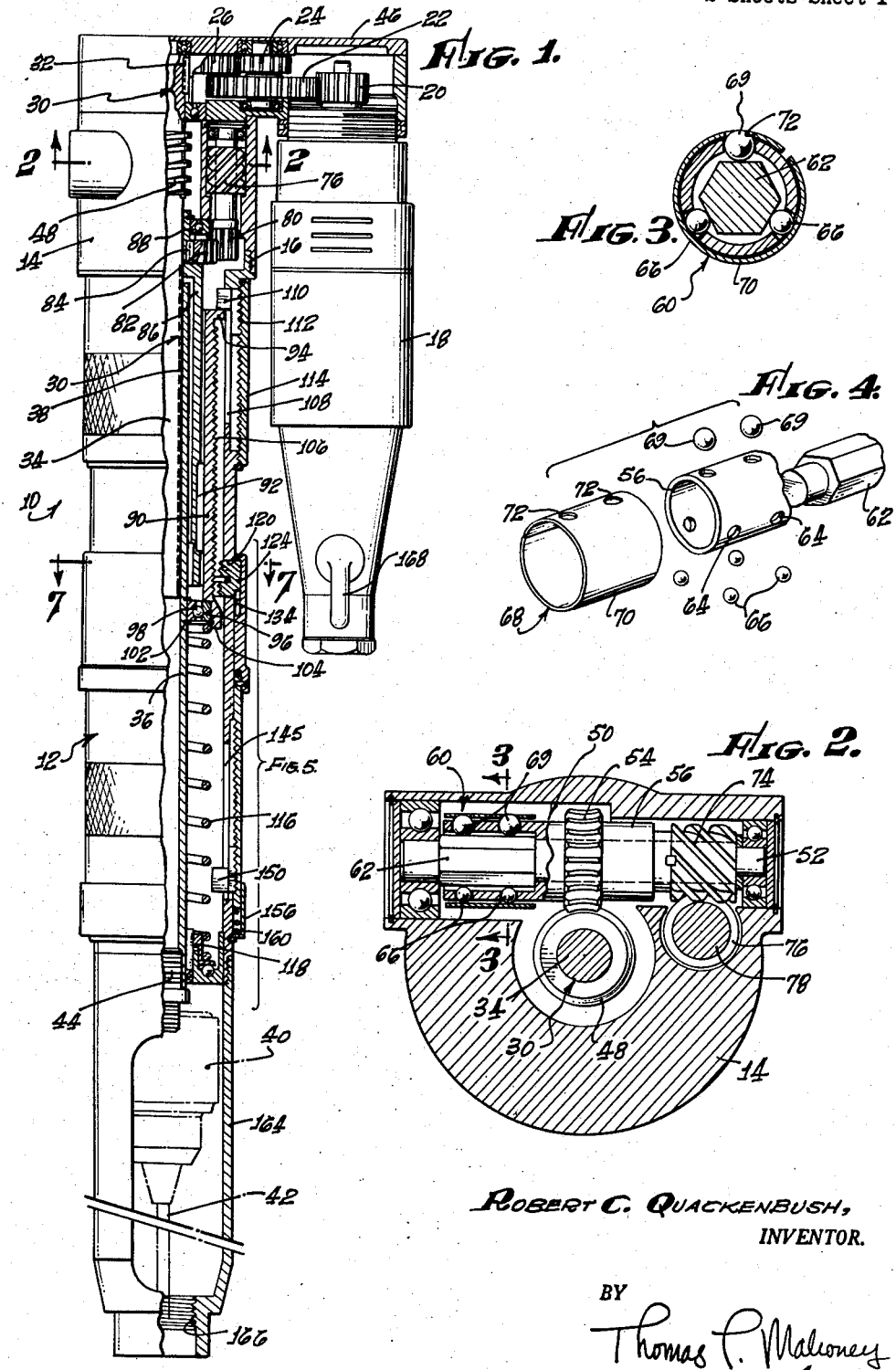
Robert C. Quackenbush,
INVENTOR.
BY Thomas P. Maloney
ATTORNEY.

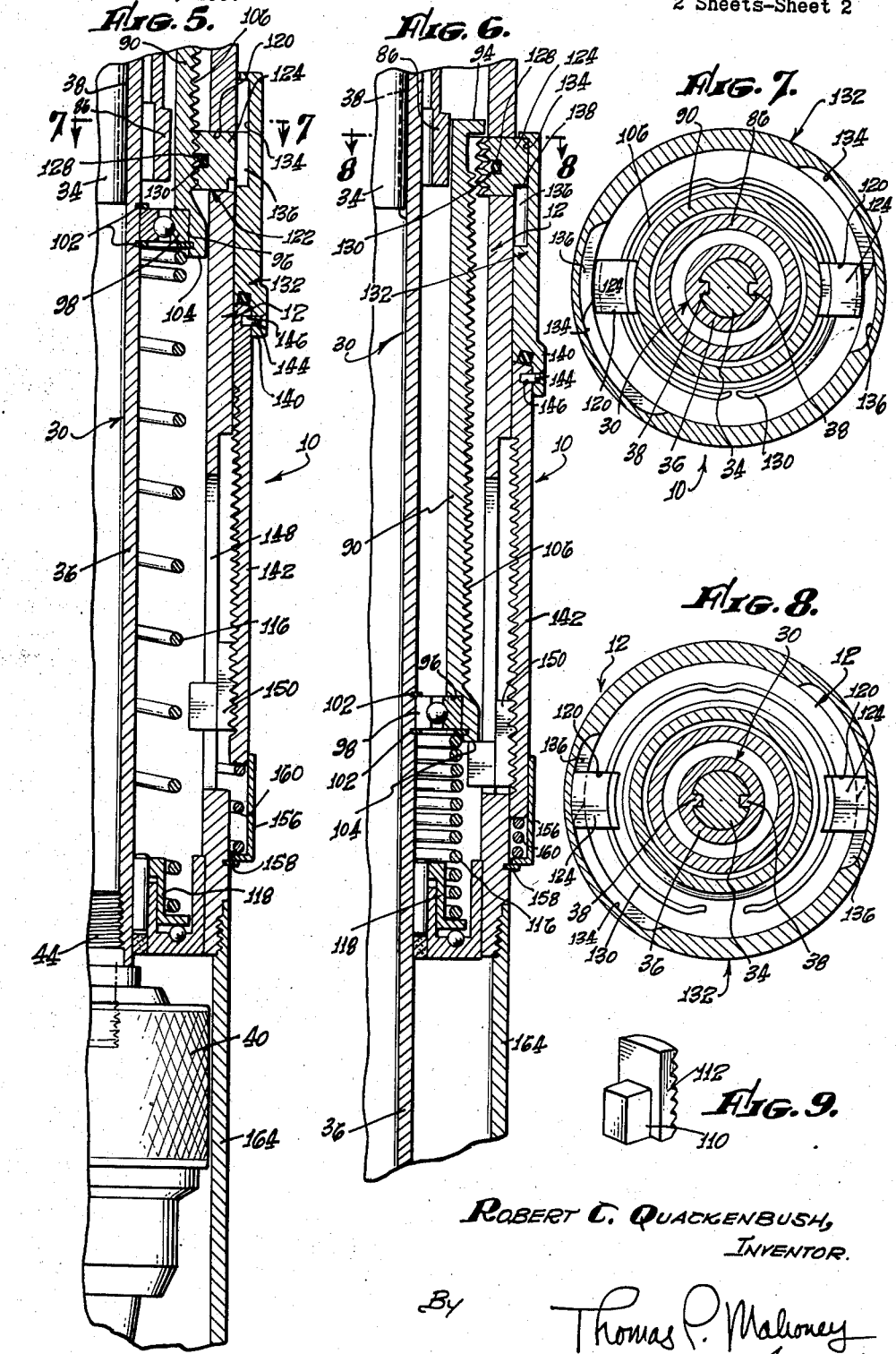

United States Patent Office 2,913,934
Patented Nov. 24, 1959

2,913,934

TOOL FEEDING DEVICE WITH MEANS FOR LIMITING STROKE OF TOOL

Robert C. Quackenbush, San Fernando, Calif.

Application February 11, 1957, Serial No. 639,364

12 Claims. (Cl. 77—33.1)

This invention relates to a tool feeding device and, more particularly, to a tool feeding device whereby a tool such as a drill bit is fed into a workpiece at a predetermined rate and, therefore, there is no necessity for the workman to exert undue pressure upon the tool to accomplish feeding thereof into the workpiece.

An object of my invention is the provision of a tool feeding device of the aforementioned character which includes a rotatable drive shaft constituted by first and second portions rotatable as a unit with the second portion being movable outwardly from the housing of the device to feed a tool mounted thereupon into the workpiece and wherein stop means is provided in the housing to limit outward movement of the second portion of the drive shaft and thus to determine the depth to which the tool is fed into said workpiece.

A further object of my invention is the provision of a device of the aforementioned character wherein the aforesaid stop is mounted for movement in the associated housing so that it may be adjusted with respect thereto by adjustment means associated therewith in order to locate it in a predetermined relationship with the housing and thus to vary the point at which it limits outward movement of the second portion of the drive shaft and the tool operatively associated therewith.

Another object of my invention is the provision of a tool feeding device having an extensible drive shaft and means for returning said extensible drive shaft after extension thereof which also incorporates motion limiting means for determining the extent to which the extensible drive shaft will be returned into the housing of the device and which thus causes the tool mounted in association with the extensible drive shaft to return to a predetermined point on each return stroke of said drive shaft.

A further object of my invention is the provision, in a device of the aforementioned character, of adjustment means whereby the motion limiting means described hereinabove can be located in any one of a plurality of positions with respect to the housing of the device in which it is incorporated so that the extent to which the extensible drive shaft is returned into the housing may be determined.

An additional object of my invention is the provision of a tool feeding device incorporating an extensible drive shaft having advancement or extension means associated therewith whereby a portion of said drive shaft may be advanced or extended from the housing and which includes means mounted upon the housing and engageable with said advancement or extension means to initiate the extension of the drive shaft and its associated tool from the housing, the previously mentioned stop means being operatively connected with said means for initiating the extension of the drive shaft from the housing so that when the stop means is engaged by the movement of the drive shaft into a predetermined position the means for initiating the extension of the drive shaft will be de-energized and the drive shaft automatically returned to its retracted position.

One of the problems encountered in the utilization of a tool feeding device of the character of my invention is the fact that the predetermined speed with which the tool is fed into the workpiece will frequently cause the tool to be driven into obstructions in the workpiece because of the great power thereof, resulting in damage to the tool and possible damage to the tool feeding device.

Another object of my invention is the provision, in a tool feeding device of the aforementioned character, of a power take-off means which is connected between the first and second portions of the drive shaft of the device so that the power take-off can provide the necessary energy for the advancement of the extensible second portion of the drive shaft and wherein there is provided in the power take-off automatic clutch means adapted to prevent further advancement of the second portion of the drive shaft when the tool being advanced thereby encounters an obstacle or other blockage in the workpiece.

Other objects and advantages of my invention will be apparent from the following specification and the accompanying drawings which are for the purpose of illustration only and in which:

Fig. 1 is a vertical, sectional view of a tool feeding device constructed in accordance with the teachings of my invention;

Fig. 2 is a transverse, sectional view taken on the broken line 2—2 of Fig. 1;

Fig. 3 is an enlarged, fragmentary view taken on the broken line 3—3 of Fig. 2;

Fig. 4 is an exploded view of the components of the automatic clutch included in the showing in Fig. 3;

Fig. 5 is an enlarged, fragmentary view of a portion of the tool feeding device as embraced by the line designated "Fig. 5" in Fig. 1 of the drawings;

Fig. 6 is a view similar to Fig. 5 showing the component parts of the tool feeding device in a different position from Fig. 5;

Fig. 7 is a transverse, sectional view taken on the broken line 7—7 of Figs. 1 and 5;

Fig. 8 is a transverse, sectional view taken on the broken line 8—8 of Fig. 6; and Fig. 9 is an enlarged, perspective view of a component part of the tool feeding device.

Referring to the drawings and particularly to Fig. 1 thereof, I show a tool feeding device 10 constructed in accordance with the teachings of my invention and being incorporated in an elongated, cylindrical housing 12. Mounted upon the upper extremity of the housing 12, as viewed in Fig. 1 of the drawings, is a power take-off housing 14 which is secured to the housing 12 by means of a threaded connection 16 and which serves to mount an air motor 18 in operative relationship with the tool feeding device 10.

The air motor 18 is of conventional construction and includes a spur gear 20 engaged upon a gear 22 which, in turn, drives a gear 24 in mesh with a drive gear 26 connected to the upper extremity of the drive shaft 30 by means of a key 32 interposed therebetween. The drive shaft 30 is, as best shown in Fig. 1 of the drawings, constituted by a first portion 34 and a second portion 36, the first portion 34 being provided with splines 38 in the outer periphery thereof and said splines being engageable by mating splines upon the inner wall of the second portion 36 which is of substantially tubular configuration and which has mounted in the lower extremity thereof a tool chuck 40 for supporting a drill bit 42 or other tool to be fed into a workpiece, not shown.

The operative connection between the chuck 40 and the lower extremity of the drive shaft 30 is constituted by a nipple 44, as best shown in Fig. 1 of the drawings.

The first portion 34 of the drive shaft 30 is thus caused to rotate the second portion 36 of said drive shaft by means of the operative connection between the air motor 18 and said drive shaft and the second portion 36 of said drive shaft is extensible, in a manner to be described in greater detail below, from the associated housing 12 in order that the tool 42 may be carried into a workpiece, not shown, at a predetermined rate of feed and in order that no effort need be exerted by the operator of the tool feeding device to urge said tool into the workpiece.

It will be noted that a cover 46 is provided on the upper extremity of the tool feeding device 10 which can be removed to expose the gears 20, 22, 24 and 26, thus permitting said gears to be removed and permitting the speed of rotation of the drive shaft 30 to be changed.

A worm 48 is formed upon the first portion 34 of the drive shaft 30 and is, as best shown in Fig. 2 of the drawings, operatively engaged with a power take-off 50 which includes a transversely oriented shaft 52 mounting a worm wheel 54 centrally thereof. The worm wheel 54 is mounted on a collar 56 encompassing the shaft 52 and is operatively connected thereto by means of a clutch, generally indicated at 60. The clutch 60, as best shown in Figs. 2–4 of the drawings, includes a polygonal boss 62 formed on the left-hand extremity of the shaft 52, as best shown in Fig. 2 of the drawings, said boss being encompassed in the collar 56. A plurality of openings 64 is provided in the collar 56 for the reception of a plurality of balls 66 which impinge upon the periphery of the polygonal boss 62 and which are maintained in operative engagement therewith by means of a compression member formed from a split ring 70.

The split ring 70 can be formed from spring steel, or the like, and is provided with a plurality of openings 72 adapted to engage, as best shown in Fig. 3 of the drawings, upon a pair of larger balls 69. The balls 66 engaged in the openings 72 thus maintain the split ring 70 in predetermined orientation with respect to the collar 56 and prevent rotational or lateral shifting of the split ring in respect thereto. Thus, the split ring 70 serves, as best shown in Figs. 2 and 3 of the drawings, to urge the balls 66 inwardly into engagement with the flats on the opposite sides of the polygonal boss 62 to create an operative connection between the collar 56 and the shaft 52. Thus, power is transmitted through the worm 48, the gear 54, the collar 56, the clutch 60, and the shaft 52 to a gear 74 mounted upon the right-hand extremity of the shaft, as best shown in Fig. 2 of the drawings, and engaging a corresponding gear 76 which rotates a shaft 78 having a spur gear 80 mounted upon its lower extremity, as best shown in Fig. 1 of the drawings.

The spur gear 80 is in mesh with a gear 82 secured by means of a key 84 to the upper extremity of an elongated sleeve 86 which is mounted for rotation on a bearing 88. The elongated sleeve 86 encompasses the drive shaft 30 and the upper extremity of the second portion 36 of said drive shaft is slidable therein.

A mating sleeve 90 is operatively connected by means of a key 92 to the elongated sleeve 86 and is rotatable thereby through the action of the power take-off 50. A lip 94 is formed upon the upper extremity of the sleeve 90 and a socket 96 is provided in the lower extremity thereof for the reception of a bearing 98, the inner race of which is connected to the exterior of the second portion 36 of the drive shaft 30 by means of snap rings 102. It is, therefore, obvious that the lower extremity of the sleeve 90 is operatively connected to the second portion 36 of the drive shaft 30, but that the second portion 36 of the drive shaft 30 can rotate with reference to said sleeve because the operative connection of the sleeve 90 thereto is constituted by the bearing 98.

A contact area 104 is provided on the lower extremity of the sleeve 90, for a purpose which will be described in greater detail below.

Formed upon the periphery of the sleeve 90 is a lead screw 106 which constitutes, in conjunction with the sleeve 90 and the companion sleeve 86, advancement or extension means for the second portion 36 of the drive shaft 30, in a manner to be described in greater detail below. An elongated slot 108 is formed in the wall of the housing 12 and mounted for movement in said slot is a motion limiting lug 110, said motion limiting lug having a screw threaded back 112 engageable by a correspondingly threaded rotatable collar 114 mounted in overlying relationship with the slot 108.

Therefore, rotation of the collar 114 is adapted to cause corresponding upward or downward movement of the lug 110 to locate the lug 110 at any desired point along the length of the slot 108. It will be noted that the lug 110 engages the lip 94 upon the upper extremity of the lead screw bearing sleeve 90 and thus limits inward movement of the sleeve and the second portion 36 of the drive shaft 30 operatively connected thereto by means of the compression spring 116 which serves to urge the second portion 36 of the drive shaft 30 and the associated sleeve 90 inwardly into the housing 12 of the tool feeding device 10 after the second portion 36 of the drive shaft 30 has been extended from the housing 12, in a manner to be described in greater detail below.

It will be noted that the upper extremity of the compression spring 116 is engaged upon the bearing 98 and that the lower extremity thereof is mounted upon a bearing supported, rotatable seat 118 so that the spring 116 will not drag upon the bearing 98. It is, therefore, readily apparent that by rotating the collar 114 in the appropriate direction, the motion limiting lug 110 can be raised or lowered to the desired extent to correspondingly limit inward movement of the sleeve 90 and the associated second portion 36 of the drive shaft 30 into the housing 12. Inward limitation of the movement of the drive shaft 30 and, more particularly, the second portion 36 thereof, controls the extent to which the tool 42 is carried away from the workpiece, not shown, and thus eliminates unnecessary inward travel of the drive shaft second portion 36 materially increasing the number of passes which can be made at the workpiece during a predetermined length of time.

A pair of openings 120 is formed, as best shown in Figs. 1 and 5–8 of the drawings, in the wall of the housing 12, said openings being disposed oppositely each other and being adapted to receive means 122 for initiating advancement of the second portion 36 of the drive shaft 30 from the housing 12, said means being constituted by half-nuts 124 mounted in the openings 120, said nuts, as best shown in Figs. 5 and 6 of the drawings, being provided with spring receiving slots 128 for the reception of the arms of a spring 130 located therein.

The spring 130, as best shown in Figs. 6 and 8 of the drawings, serves to urge the nuts 124 outwardly in the openings 120 and out of engagement with the corresponding threads on the lead screw 106. The threads on the nuts 124 are, of course, formed correspondingly with the threads on the lead screw 106 and are adapted to be urged into engagement with the same against the bias of the spring 130 by the action of a rotatable control constituted by an elongated collar 132. The collar 132 is provided with oppositely disposed recesses 134 and at the bottom of and at one side of each of said recesses is provided a cam 136 engageable with the back of an associated nut 124 and adapted, when rotated into engagement with the back of said nut, to urge said nut inwardly to engage the teeth thereupon with the correspondingly threaded exterior of the lead screw 106.

It will be noted that, as best shown in Fig. 5 of the drawings, when the cam engages the back of the associated nut 124, it holds it in engagement with the lead screw 106 and that, as best shown in Fig. 6, when the cam 136 is disengaged therefrom, the back of the nut overlies the upper edge of the cam because of the provision of a notch 138 in the back of the nut 124.

The lower extremity of the collar 132 is provided with a skirt 140 which overlies and is operatively connected to an adjustment sleeve 142 by means of a screw 144 located in an annular slot 146 in the upper extremity of the adjustment sleeve 142. Thus, the collar 132 can rotate respectively to the sleeve 142 and vice versa but is operatively connected to the sleeve 142 for longitudinal movement, in a manner which will be described in greater detail below.

Formed in the wall of the housing 12 adjacent the lower extremity thereof is an elongated slot 148 in which is mounted a stop 150 which is threadedly engaged by the adjustment sleeve 142 and which can, by rotation of the sleeve 142, be moved upwardly or downwardly in the slot 148 to determine its location in said slot and to determine the extent to which the advancement means constituted by the lead screw 106 can extend the second portion 36 of the drive shaft 30 from the housing 12.

For instance, as best illustrated in Fig. 6 of the drawings, when the contact area 104 on the lower extremity of the sleeve 90 engages the stop 150, further outward movement of the second portion 36 of the drive shaft 30 is terminated, in a manner to be described in greater detail below.

Overlapping the lower extremity of the adjustment sleeve 142 is a substantially cylindrical enclosure 156, said enclosure being secured to the housing 12 by means of a ring 158 and encompassing a compression spring 160 which is seated in the lower extremity of said enclosure and has its upper extremity engaging the lower end of the adjustment sleeve 142. Thus, it can be seen that the normal tendency of the spring 160 is to bias the adjustment sleeve 142 upwardly with respect to the housing 12 in the manner shown in Fig. 5 of the drawings wherein the adjustment sleeve is urged upwardly by the spring 160 to maintain the cam 136 in operative relationship with the back of an associated nut 124.

The upward movement of the adjustment sleeve 142 is, of course, communicated to the collar 132 because of the interconnection therebetween. Threadedly engaged upon the lower extremity of the housing 12 is a shroud 164 which is threaded at 166 to permit the tool feeding device to be mounted upon a suitable mount or bushing.

The device 10 is operated in the following manner: The air motor 18, or other source of power, may be energized by the rotation of a valve control lever 168 which causes corresponding rotation of the spur gear 20 and the gear train operatively connected thereto to initiate rotation of the drive shaft 30 and the first and second portions thereof. Rotation of the drive shaft 30 is accompanied by simultaneous rotation of the worm 48 and corresponding rotation of the power take-off 50. Energization of the power take-off 50 results in rotation of the sleeve 90 by means of the sleeve 86.

Ordinarily, the sleeve 90 can rotate freely and has no effect upon the position of the second portion 36 of the drive shaft 30 in the housing 12. To cause the extension or advancement of the second portion 36 of the drive shaft 30 from the housing 12 and thus corresponding advancement of the tool 42 to an associated workpiece, not shown, the collar 132 must be rotated to permit the cams 136 to drive the nuts 124 inwardly against the bias of the spring 130 and into engagement with the lead screw 106 which has, of course, been continuously rotating during the inactive period. As the nuts 124 engage the lead screw 106, the rotary motion thereof is converted into linear motion and the sleeve 90 is carried outwardly to cause concomitant outward movement or extension of the second portion 36 of the drive shaft 30 from the housing 12.

Such outward movement of the drive shaft second portion 36 will continue until the contact face 104 on the lower extremity of the sleeve 90 engages the stop 150. When such engagement takes place in the manner shown in Fig. 6 of the drawings, the stop 150 is carried downward slightly with the adjustment sleeve 142 therefor which, because of the positive connection between the adjustment sleeve 142 and the collar 132 causes corresponding downward movement of said collar.

When the collar 132 is moved downwardly, the cam 136 is released from the associated nut 124 and assumes a position immediately underlying said nut, as best shown in Figs. 6 and 8 of the drawings. When the cam is located under the nut 124 in this position, the spring 160 is retained in compressed condition and the upper extremity of the cam 136 is located in the notch 138 of the associated nut 124. Since the cam 136 has been released from the nut 124, operative engagement of the nut 124 in each side of the lead screw 106 has been eliminated and the spring 116 which was in the compressed condition shown in Fig. 6 of the drawings now instantaneously returns the sleeve 90 and the second portion 36 of the drive shaft 30 operatively connected thereto to retract said sleeve and said second portion into the housing 12 to an extent permitted by the motion limiting lug 110.

As previously indicated, the motion limiting lug 110 engages the contact lip 94 on the upper extremity of the sleeve 90 and determines how far the spring 116 is permitted to retract the sleeve 90 and the associated second portion 36 of the drive shaft 30.

When it is desired to once again initiate extension of the second portion 36 of the drive shaft 30 from the housing 12, it is necessary to rotate the collar 132 so that the back of the nut 124 will clear the associated cam 136 and the spring 160 then assists in urging the collar 132 upwardly to juxtapose the back of the nut 124 to an associated cam 136. Rotation of the collar 132 will once again engage the cam 136 with its associated nut and urge the nuts 124 into operative engagement with the lead screw 106 upon the sleeve 90 to cause advancement and extension of the second portion 36 of the drive shaft 30 from the housing 12.

If the tool 42 should encounter an obstacle in the workpiece during its advancement by the second portion 36 of the drive shaft 30 and the obstacle is such that it would seriously damage the tool 42 or the tool feeding device 10, excessive torque upon the clutch 60 as induced therein and transmitted thereto by the polygonal boss 62 on the shaft 52 will cause a reaction on the balls 66 urging them outwardly against the compressive effect of the split ring 70 and permitting the polygonal boss 62 to rotate relatively to the collar 56 and thus preventing the further extension of the second portion 36 of the drive shaft 30 from the housing 12.

Once the obstruction has been removed, the clutch 60 will once again take hold and advancement of the second portion 36 of the drive shaft 30 can continue.

I claim as my invention:

1. In a tool feeding device, the combination of: a housing having an elongated slot formed in its wall adjacent the outer extremity thereof; a composite drive shaft mounted in said housing for rotation therein, said drive shaft including a first rotatable portion fixed against longitudinal movement and a second rotatable portion adapted for longitudinal movement on said first portion; a power take-off connected to said drive shaft; means for causing longitudinal movement of said second portion of said drive shaft rotatable by said power take-off at a speed different from the speed of rotation of said drive shaft; a control on said housing for initiating outward movement of said second portion of said drive shaft; and a stop slidably mounted in said slot for de-energizing said control when said second portion of said drive shaft has been shifted a predetermined distance outwardly into engagement with said stop.

2. In a tool feeding device, the combination of: a housing having an elongated slot formed in its wall adjacent the outer extremity thereof; a composite drive shaft mounted in said housing for rotation therein, said drive shaft including a first rotatable portion fixed against longitudinal movement and a second rotatable portion adapted for longitudinal movement on said first portion; a power take-off connected to said drive shaft; means for causing longitudinal movement of said second portion of said drive shaft rotatable by said power take-off at a speed different from the speed of rotation of said drive shaft; a control on said housing for initiating outward movement of said second portion of said drive shaft; and a stop slidably mounted in said slot for de-energizing said control when said second portion of said drive shaft has been shifted a predetermined distance outwardly to engage said stop; and a threaded collar encompassing the outer extremity of said housing and overlying said slot to engage a corresponding thread on said stop whereby rotation of said collar causes longitudinal movement of said stop in said slot.

3. In a tool feeding device, the combination of: a housing having an elongated slot in its wall adjacent its inner extremity; a composite drive shaft mounted in said housing for rotation therein, said drive shaft including a first rotatable portion fixed against longitudinal movement and a second rotatable portion adapted for longitudinal movement on said first portion; a power take-off connected to said drive shaft; means for causing longitudinal movement of said second portion of said drive shaft rotatable by said power take-off at a speed different from the speed of rotation of said drive shaft; a control on said housing for initiating outward movement of said second portion of said drive shaft; spring means in said housing for shifting said second portion of said drive shaft to its retracted position; and limiting means movable in said housing slot for terminating inward movement of said second portion of said drive shaft by said spring means.

4. In a tool feeding device, the combination of: a housing having elongated slots in the wall thereof adjacent its inner and outer extremities; a composite drive shaft mounted in said housing for rotation therein, said drive shaft including a first rotatable portion fixed against longitudinal movement and a second rotatable portion adapted for longitudinal movement on said first portion; a power take-off connected to said drive shaft; means for causing longitudinal movement of said second portion of said drive shaft rotatable by said power take-off at a speed different from the speed of rotation of said drive shaft; a control on said housing for initiating outward movement of said second portion of said drive shaft; a stop slidably mounted in said outer slot of said housing for de-energizing said control when said second portion of said drive shaft has been shifted a predetermined distance outwardly; spring means in said housing for shifting said second portion of said drive shaft to its retracted position; and limiting means in said inner slot of said housing for terminating inward movement of said second portion of said drive shaft by said spring means.

5. In a tool feeding device, the combination of: a housing having first and second openings in the wall thereof; a main drive shaft having a first rotatable portion fixed against longitudinal movement and a second rotatable portion movable longitudinally with respect to said first portion; a lead screw operatively connected to said second portion for causing longitudinal movement thereof; a power take-off connected between said drive shaft and said lead screw; a nut mounted in said first opening for inward movement into engagement with said lead screw to translate said lead screw and cause longitudinal movement of said second portion of said drive shaft; a control on said housing overlying said first opening for urging said nut into engagement with said lead screw; a longitudinally movable stop mounted in said second opening for limiting outward movement of said second portion of said drive shaft; and adjustment means on the exterior of said housing and overlying said second opening for shifting said stop into a desired position with respect to said housing.

6. In a tool feeding device, the combination of: a housing having a plurality of openings in the wall thereof; a main drive shaft having a first rotatable portion fixed against longitudinal movement and a second rotatable portion movable longitudinally with rsepect to said first portion; a lead screw operatively connected to said second portion for causing longitudinal movement thereof; a power take-off connected between said drive shaft and said lead screw; a nut mounted in one of said openings for inward movement into engagement with said lead screw to translate said lead screw and cause longitudinal movement of said second portion of said drive shaft; a control on said housing overlying said one opening for urging said nut into engagement with said lead screw; limiting means mounted in the other opening in said housing for preventing inward movement of said drive shaft beyond a predetermined point; and locating means for said limiting means mounted on the exterior of said housing and overlying said other opening whereby said limiting means can be disposed in a selected position with respect to said housing.

7. In a tool feeding device, the combination of: a housing having an opening in a wall thereof; a drive shaft mounted for rotation in said housing, said drive shaft including a first portion fixed against longitudinal movement and a second portion movable longitudinally with respect to said first portion; a power take-off connected to said first portion of said drive shaft; a lead screw driven by said power take-off and operatively connected to said second portion to advance the same from said housing; a nut mounted in said opening in said housing for inward movement into engagement with said lead screw; and a rotatable and longitudinally movable collar having cam means thereupon overlying and engageable with said nut to urge said nut into engagement with said lead screw.

8. In a tool feeding device, the combination of: a housing; a drive shaft mounted for rotation in said housing, said drive shaft including a first portion fixed against longitudinal movement and a second portion movable longitudinally with respect to said first portion; a power take-off connected to said first portion of said drive shaft; a lead screw driven by said power take-off and operatively connected to said second portion to advance the same from said housing; a nut mounted in said housing engageable with said lead screw; a rotatable and longitudinally movable collar having a cam thereupon engageable with said nut to urge said nut into engagement with said lead screw; and a stop on said housing engageable by means on said second portion of said drive shaft, said stop being connected to said collar and adapted to release the cam thereupon from engagement with said nut when said stop is engaged by said means on said second portion of said drive shaft.

9. In a tool feeding device, the combination of: a housing; a drive shaft mounted for rotation in said housing, said drive shaft including a first portion fixed against longitudinal movement and a second portion movable longitudinally with respect to said first portion; a power take-off connected to said first portion of said drive shaft; a lead screw driven by said power take-off and operatively connected to said second portion to advance the same from said housing; a nut mounted in said housing engageable with said lead screw; a first, rotatable and longitudinally movable collar having a cam thereupon engageable with said nut to urge said nut into engagement with said lead screw; a stop on said housing engageable by means on said second portion of said drive shaft; a second collar mounted for rotation on said housing and connected to said cam collar, said stop being connected to said second collar and engageable by said means on said second portion of said drive shaft to urge said collars downwardly on said housing and release said cam from said nut.

10. In a tool feeding device, the combination of: an elongated, cylindrical housing having a wall provided with an elongated slot adjacent its outer extremity and an intermediate opening adjacent said slot; a drive shaft mounted for rotation in said housing, said drive shaft including a first portion fixed against longitudinal movement and a second portion movable longitudinally with respect to said first portion; a power take-off connected to said first portion of said drive shaft; a lead screw driven by said power take-off and operatively connected to said second portion to advance the same from said housing; a nut mounted in said opening in the wall of said housing for radial movement into engagement with the periphery of said lead screw; a rotatable and longitudinally movable control overlying said opening and provided with a cam engageable with said nut to cause radial movement thereof by engagement of said cam with said nut; a stop mounted in said slot for longitudinal movement and engageable by means on said second portion of said drive shaft; and a rotatable and longitudinally movable control for said stop on said housing engageable with said stop to cause longitudinal movement thereof, said stop control being operatively connected to said nut control.

11. In a tool feeding device, the combination of: an elongated, cylindrical housing having a wall provided with an elongated slot adjacent its outer extremity and an intermediate opening adjacent said slot; a drive shaft mounted for rotation in said housing, said drive shaft including a first portion fixed against longitudinal movement and a second portion movable longitudinally with respect to said first portion; a power take-off connected to said first portion of said drive shaft; a lead screw driven by said power take-off and operatively connected to said second portion to advance the same from said housing; a nut mounted in said opening in the wall of said housing for radial movement into engagement with the periphery of said lead screw; a rotatable and longitudinally movable control overlying said opening and provided with a cam engageable with said nut to cause radial movement thereof by engagement of said cam with said nut; a stop mounted in said slot for longitudinal movement and engageable by means on said second portion of said drive shaft; a rotatable and longitudinally moveable control for said stop on said housing engageable with said stop to cause longitudinal movement thereof, said stop control being operatively connected to said nut control; and spring means on said housing engageable with said stop control for urging said stop control and said nut control inwardly on said housing to maintain said cam on said nut control in operative engagement with said nut.

12. In a tool feeding device, the combination of: an elongated, cylindrical housing having first and second openings formed in the wall thereof and communicating with the interior of said housing; a drive shaft mounted for rotation in said housing, said drive shaft including a first portion fixed against longitudinal movement and a second portion movable longitudinally with respect to said first portion; a power take-off connected to said first portion of said drive shaft; a lead screw driven by said power take-off and operatively connected to said second portion to advance the same from said housing; a nut mounted in said first opening for movement into engagement with said lead screw; a rotatable and longitudinally movable collar encompassing said housing and overlying said opening, said collar having cam means thereupon engageable with said nut and being longitudinally movable between a first position in which said nut is disposed inwardly of said cam means and a second position in which said nut is juxtaposed to said cam means; a longitudinally movable stop mounted for sliding movement in said second opening and engageable by means on said second portion of said drive shaft to terminate outward movement of said second portion; and a second collar engageable with said stop for locating the same in said second opening, said second collar being longitudinally movable on said housing whereby, when said means on said second portion of said drive shaft engages said stop, said stop will be carried outwardly to shift said nut and stop collars and return said nut collar to its first position.

References Cited in the file of this patent
UNITED STATES PATENTS

| | | |
|---|---|---|
| 1,946,214 | Kabigting | Feb. 6, 1934 |
| 2,777,339 | Hess | Jan. 15, 1957 |
| 2,791,922 | Robinson | May 14, 1957 |